Oct. 24, 1961   J. FULTON   3,005,656
COT HOLDER FOR EMERGENCY VEHICLES
Filed Aug. 19, 1960   2 Sheets-Sheet 1
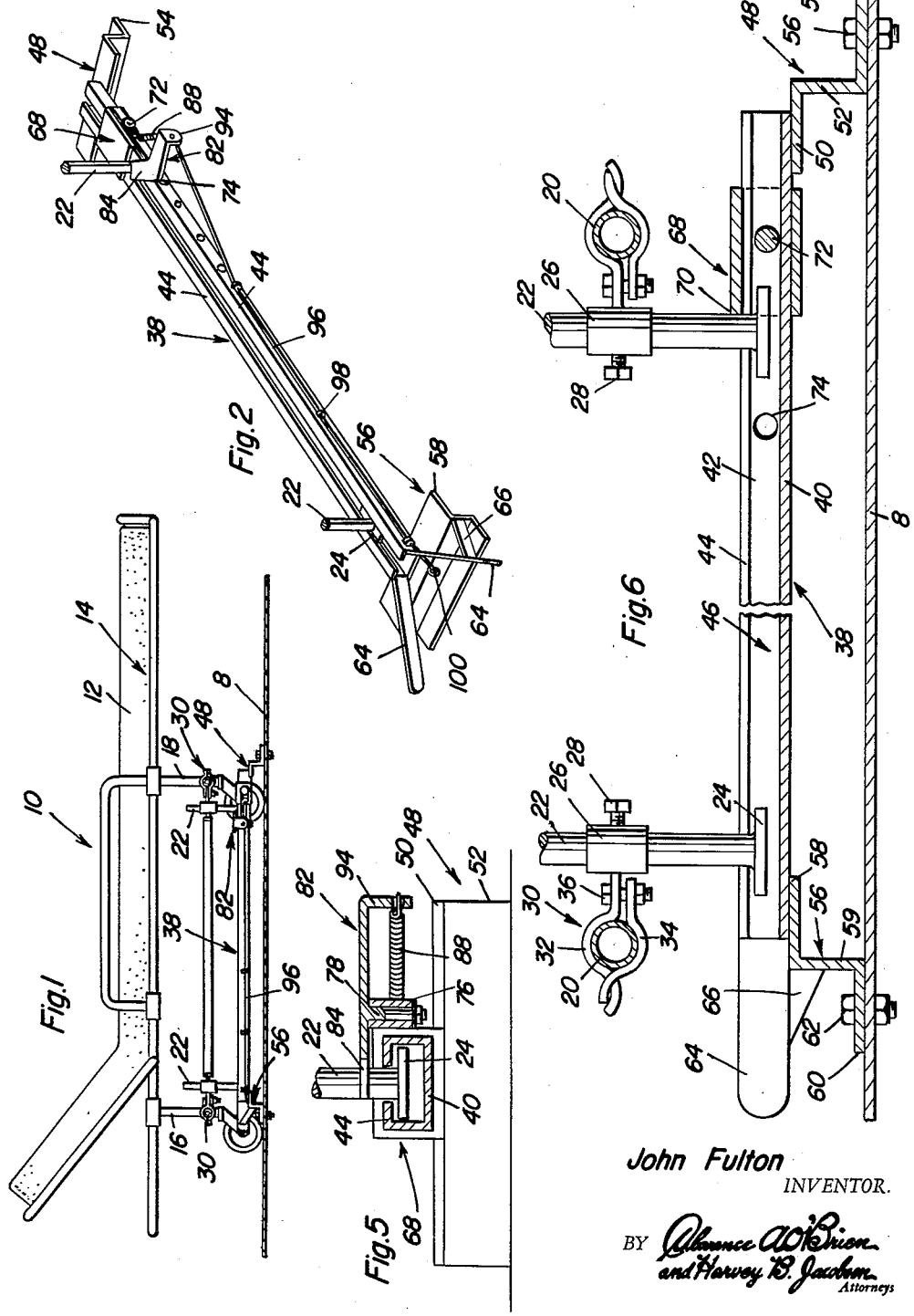
John Fulton
INVENTOR.

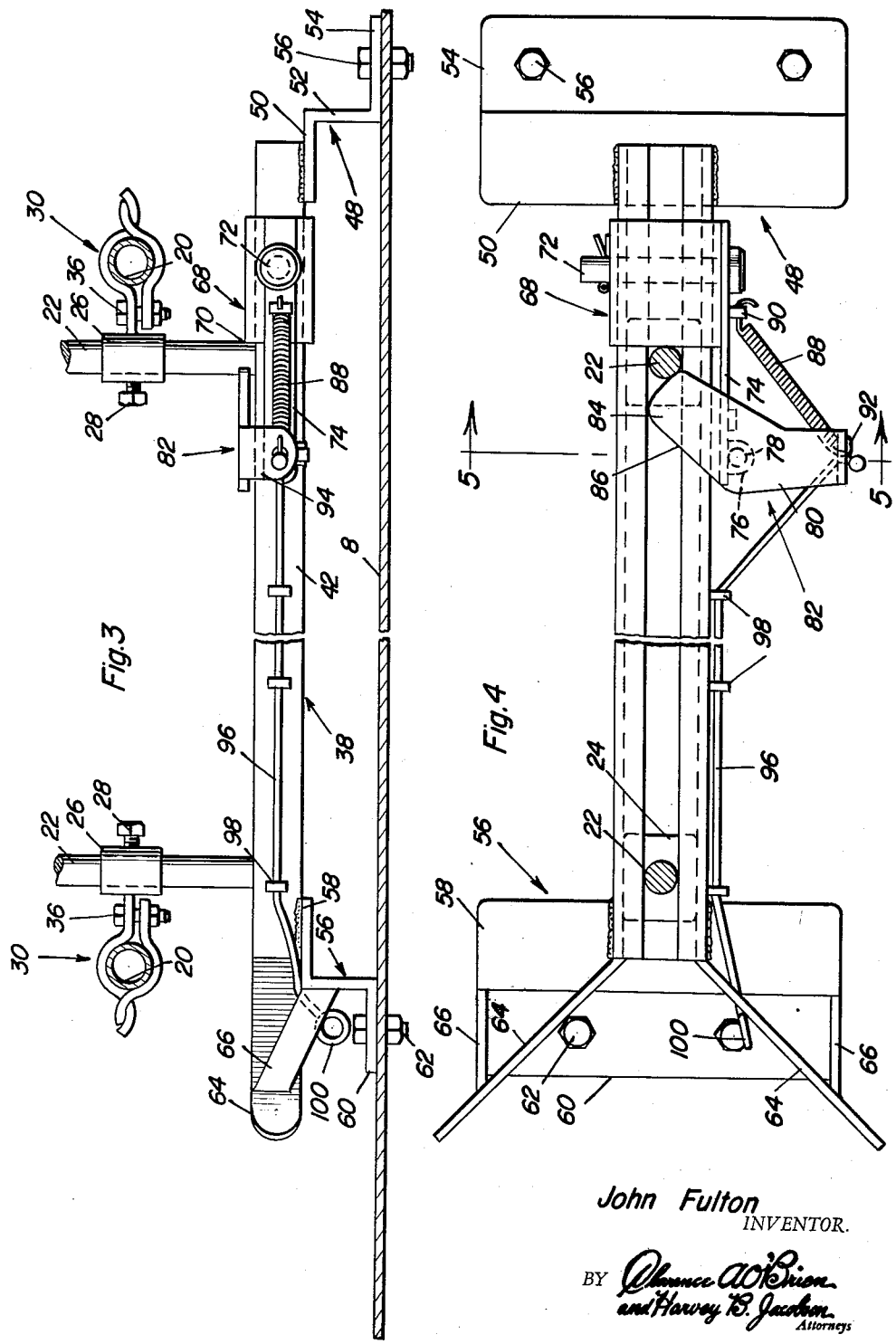

United States Patent Office 3,005,656
Patented Oct. 24, 1961

3,005,656
COT HOLDER FOR EMERGENCY VEHICLES
John Fulton, 607 1st St. NW., Belmond, Iowa
Filed Aug. 19, 1960, Ser. No. 50,732
6 Claims. (Cl. 296—19)

The present invention relates to an improved cot holder which, generally speaking, is suitably designed and adapted to function an emergency-type vehicle, for instance, an ambulance, and has to do with means for guiding, positioning and holding the cot in an intended patient transporting position in a manner to prevent displacement of the cot when the vehicle is in motion.

By way of introduction, it will expedite the presentation here by thinking of the concept as having to do with an ambulance cot and the ambulance in which it is transported when in use. At the same time, it should also be kept in mind that vehicles such as are used by rescue squads and perhaps even certain station wagons lend themselves adaptable to conveyances for cots. Also, there are many varied styles and forms of patient and invalid-handling cots but here again, it will apparently suffice to assume that the cot in question is one which is characterized by a frame having a pair of front legs and a pair of back legs joined by a cross brace and provided with casters.

With the above in mind a glance at the views of the accompanying drawings will reveal that, more specifically speaking, the present invention pertains to a single track which is arranged lengthwise of the floor of the vehicle and is bracketed thereto in a centralized position. This construction and arrangement allows the legs of the cot to straddle the intervening track. Consequently, by providing the cross pieces or braces with auxiliary hold-down members or legs, the cot with these auxiliary legs may be slid into place relative to the track and, with the provision of latch means on the track, the cot is latched and securely held in its intended anchored position in the space provided therefor in the ambulance or other vehicle.

As is perhaps evident from the preceding description, retaining and holding devices of many and varied forms have been proposed and offered by others engaged in this line of endeavor including, in example, holding devices such as are used for a truck, a hearse or the like. In carrying out the invention special efforts and mechanical means are being restorted to here with a view toward advancing the art and achieving the cot accommodating and retaining advantages in an expedient, practical and reliable manner.

To the end that the objectives under advisement may be accomplished, it should be noted that but a single track is required. This achievement makes for simplicity and economy. Using a single track and straddling the same with the caster-equipped legs of the cot expedites the step of inserting and removing the cot and by reason of the intake end of the track, the auxiliary hold-down legs which slip into the channel of the track are expediently and reliably piloted into place.

Not only is the single track idea of significance, the means adapting the cot for use in association therewith is also a matter of moment. This is to say, the frame and leg structure of the cot is not to be altered. Instead, clamps are provided on the central portions of the horizontal braces between the front and rear legs and these clamps serve to accommodatingly support simple headed hold-down members or auxiliary legs which slip into the channel of the track and are easily and readily latched in position.

In carrying out a preferred embodiment of the invention the track comprises an open-ended tube which is preferably rectangular in cross-section. The top wall thereof is provided with a slot opening through the ends of the tube and defining the desired keying channel. The end portions of this track or tube are secured on angle brackets bolted to the floor of the ambulance or other conveyance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in side elevation showing a conveyance or ambulance floor in section, showing the ambulance cot in side elevation, and the holding means, the invention, in side elevation and in use.

FIG. 2 is a view in perspective showing that part of the structure or invention which is fastened securely on the floor of the ambulance.

FIG. 3 is a view on a larger scale showing details which are not clear from the smaller view in FIG. 1, the major portions of the ambulance cot being omitted to clarify the figure.

FIG. 4 is a top plan view on a scale similar to that utilized in FIG. 3 and also with the cot and other component parts intentionally omitted for clearness.

FIG. 5 is a section on the horizontal line 5—5 of FIG. 4 looking in the direction of the arrows.

FIG. 6 is a view in section and elevation which may be interpreted as a central longitudinal section of the construction depicted in FIG. 4.

Referring first to the assembly view identified as FIG. 1, the conveyance or ambulance floor is denoted by the numeral 8. The invention is such in character and nature to be applied to any other relatively stationary floor where a wheel supported mobile cot or the like is to be temporarily or otherwise stored and latched and thus held in a stationary position. As to the cot 10, this may be regarded as any suitable patient-handling cot having a mattress 12 on a frame structure 14 and wherein the frame structure embodies a pair of depending front legs 16, a pair of depending rear legs 18 and horizontal cross pieces or braces 20 (FIG. 6) extending between the legs 16 and 18 but not detailed in FIG. 1. All that has to be done insofar as the cot is concerned is to provide the attachments also seen in FIG. 6, that is, the simple mechanical hold-down, sliding and keying means. The means for the front and rear legs is the same as is evident. Each adaptation thereof comprises a vertical rod member or so-called auxiliary leg 22 having a keying, guiding and retaining head 24 at the lower end thereof. This hold-down member is adjustably mounted in a sleeve 26 with the parts connectible together by an available setscrew 28. The sleeve carries a two-part clamp 30. The upper part 32 cooperates with the lower part 34 and the two parts are bolted together at 36 and are so shaped and interconnected that they embrace the cross brace 20. Thus, simple clamps 30 on the braces adjustably support headed rod members (22 and 24) the latter serving as the aforementioned guiding, positioning and hold-down members.

The part of the over-all invention which cooperates with the vehicle or conveyance floor 8 is referred to broadly as track means and this is denoted at 38. More specifically, it comprises a tube of metal some four feet, more or less, in length having a bottom wall 40 (FIG. 6), upstanding side walls 42 and turned-in parallel flanges 44. This construction and arrangement provides an open-ended keying channel 46 which is shaped to accommodatingly receive the keying and retaining heads 24 in the manner illustrated. Simple angle brackets are employed to mount the track in horizontal spaced relationship on the conveyance floor. The angle bracket at the forward or right-hand end is denoted at 48 and comprises a flange 50 joined to the channel, and elevating flange 52, and an anchoring flange 54 which is bolted in place at 56. The angle bracket at the rear or intake end of the track or channel is basically the same and is denoted by the numeral 56 and comprises flanges 58, 59 and 60 bolted in place at 62. The outwardly and rearwardly flared guide fingers 64 are rigidly joined to the side walls 42 of the track and are arranged to pilot the auxiliary legs or hold-down rods 22 into position. The numeral 66 designates diagonal braces between the piloting or guide fingers 64 and the bracket means 56.

The catch or latch means which automatically functions comprises a sleeve-like collar 68. The left-hand edge 70 constitutes a stop to limit the sliding movement of the cot when it is slid into the space of the ambulance. This collar is held in a set or an adjusted position by an adjusting and retaining pin 72 selectively alignable with keeper holes 74 provided therefor in the side walls 42. This collar is provided on one side with an extended arm 74 having a suitable bearing 76 to accommodate a hinge pin 78 on the plate portion 80 of the spring-biased or spring-loaded latch means 82. The angularly disposed flat plate portion 84 overlies the slot in the channel and is such that the edge 86 constitutes a cam and pushes the hinged latch to one side against the tension of the retaining spring 88 which spring is connected at one end at 90 and at the other end at 92 to a depending lug 94 on the latch. The latch is manually controlled by a trip cord 96 passing through guides 98 and provided at its rear end with a conveniently actuable finger ring 100.

With the channel-type track 38 secured in place by the brackets 48 and 56 and assuming that the track is mounted to extend centrally and lengthwise of the floor 8, it is necessary, of course, to straddle the track with the caster-equipped legs of the cot 10. By centering the leading end of the cot in an obvious manner the foremost auxiliary hold-down leg 22 slips into position between the guide fingers 64 and the hold-down legs are thus piloted into place as the cot is shoved into its intended position.

Obviously, when the cot is substantially fully in its lockable position the foremost leg comes into contact with the cam edge 86 of the latch and pushes the latch to one side against the tension of the spring and after the auxiliary leg has assumed the position seen in FIG. 4 it comes to a stop against the shoulder 70 and the latch returns to its automatic latching position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a structure of the class described, an elongated linearly straight track having an open-ended keying channel, attaching and anchoring brackets secured to opposite end portions of the track, said brackets being adapted to rest atop an ambulance floor and having flanges which are adapted to be bolted down on the floor, said track means being provided at one end with an adjustably mounted collar supporting and carrying a spring-loaded latch, said latch embodying a horizontal flat plate overlying the keying channel and having a marginal edge disposed at an oblique angle and defining a cam surface, at least one latchable and retainable leg having a headed end slidingly keyed and releasably held in the channel between the collar and a cooperating end portion of the latch, and a pull cord connected to and for remotely controlling the latch, said cord being provided at an operating end with a finger ring.

2. For use on the floor of an ambulance, an ambulance cot holder comprising an open-ended elongated tube having a lengthwise slot in the top thereof defining an open-ended channel-shaped track, supporting and elevating brackets secured to forward and rearward ends of said tube for fastening the same on said floor, a collar slidingly adjustable on said tube and having an arm, means for adjusting and securing the collar on said tube, a latch pivotally mounted on said arm and having a portion overlying said slot, a return spring connected at its ends to said latch and said arm, respectively, and auxiliary legs connectible to the aforementioned cot and constituting hold-down members and having heads slidingly mounted in the channel of said track, at least one of said legs having an anchoring head and said legs being disposed in a position to trigger the latch and being adapted to occupy a retained position between the latch and a cooperating edge portion of said collar.

3. For use on the floor of an ambulance, a cot holder comprising an open-ended elongated slotted tube defining an open-ended keying channel, brackets secured to opposite ends of said tube for fastening the same on the floor, a collar slidingly mounted and adjustably bolted on said tube and having an arm positioned along a side of the tube and having a bearing, a latch having a hinge pin pivotally journaled in said bearing a return spring connected to said latch and said arm, the tube at the forward end of said channel being provided with diverging piloting fingers, and auxiliary legs carried by said cross braces, said track means comprising an elongated track member linearly straight and having an open-ended keying channel, said auxiliary legs having headed lower ends slidingly mounted in said channel, said track means being provided at one end thereof with a spring-loaded pivotally mounted latch, said latch being mounted for manually shiftable adjustment on said track and having a flat plate portion thereof overlying and bridging the channel and provided with an oblique angled cam surface located in the path of movement of an adjacent one of said auxiliary hold-down legs.

4. For use on the floor of an ambulance, an ambulance cot holder comprising an open-ended elongated tube having a lengthwise slot in the top thereof defining an open-ended keying channel, brackets secured to opposite ends of said tube for fastening the same on the floor, a collar slidingly mounted for adjustment on said tube and having an arm, a latch pivotally mounted on said arm, a return spring connected to said latch and said arm, respectively, vertical rods constituting cot hold-down members and having heads slidingly mounted in said channel, and clamps secured to the rods and adapttd to fasten the same on cross braces provided therefor on the aforementioned ambulance cot.

5. In combination, an ambulance cot embodying a frame having paired front and rear legs provided with casters, horizontal cross braces between the respective front and rear legs, track means adapted to be secured to a floor and underlying the central portions of the cross braces with the legs straddling the track means, auxiliary hold-down legs carried by said cross braces, said track means comprising an elongated track member linearly straight and having an open-ended keying channel, said auxiliary legs having headed lower ends slidingly mounted in said channel, said track means being provided at one end thereof with a spring-loaded pivotally mounted latch, said latch being mounted for manually shiftable adjustment on said track and having a flat plate portion thereof overlying and bridging the channel and provided with an oblique angled cam surface located in the path of movement of an adjacent one of auxiliary hold-down legs.

6. The structure defined in claim 5, and in combination, forward and rearward angle brackets secured to forward and rearward ends of the track member and having horizontal flanges adapted to be removably bolted on said floor, said brackets being disposed in a common plane and in a plane below the bottom of the keying channel so as not to block or otherwise interfere with the respective open ends of said channel.

References Cited in the file of this patent

UNITED STATES PATENTS

| | | |
|---|---|---|
| 1,742,309 | Flanagan | Jan. 7, 1930 |
| 2,057,826 | Harris | Oct. 20, 1936 |
| 2,375,896 | Cox | May 15, 1945 |

FOREIGN PATENTS

| | | |
|---|---|---|
| 666,166 | Great Britain | Feb. 6, 1952 |